No. 859,918.

PATENTED JULY 16, 1907.

O. COLBORNE.
PIE CRUST FORMING MACHINE.
APPLICATION FILED MAR. 9, 1907.

Witnesses
Harry R. White
Ray White

Inventor
Oliver Colborne
By Rummler & Rummler
Attys

UNITED STATES PATENT OFFICE.

OLIVER COLBORNE, OF CHICAGO, ILLINOIS.

PIE-CRUST-FORMING MACHINE.

No. 859,918.  Specification of Letters Patent.  Patented July 16, 1907.

Application filed March 9, 1907. Serial No. 361,433.

*To all whom it may concern:*

Be it known that I, OLIVER COLBORNE, a citizen of the United States of America, and a resident of Chicago, county of Cook, State of Illinois, have invented certain new and useful Improvements in Pie-Crust-Forming Machines, of which the following is a specification.

Figure 1:
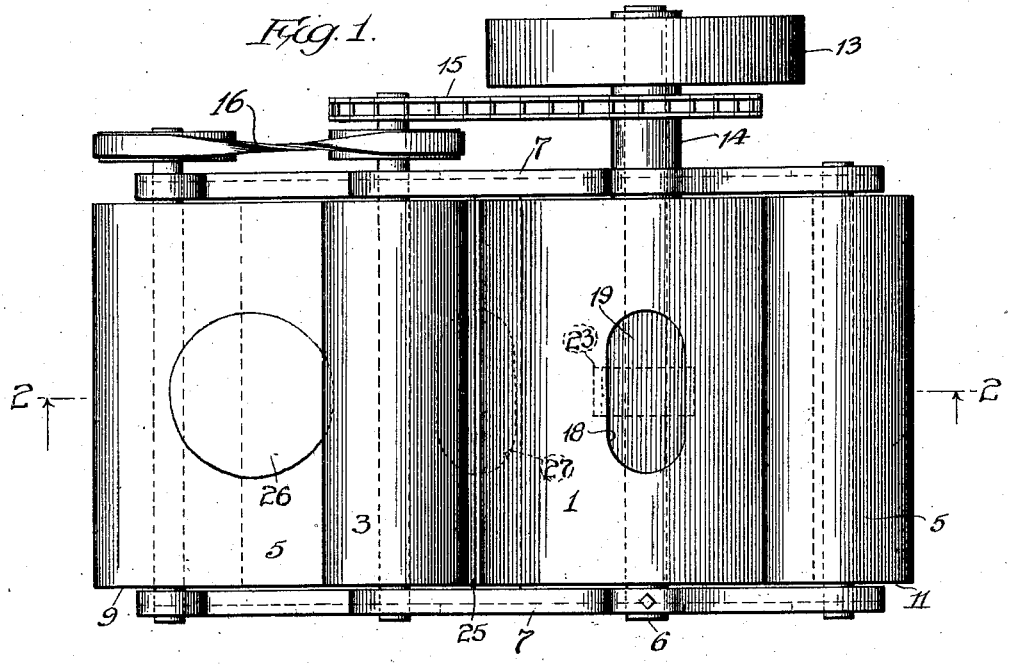
Figure 2:
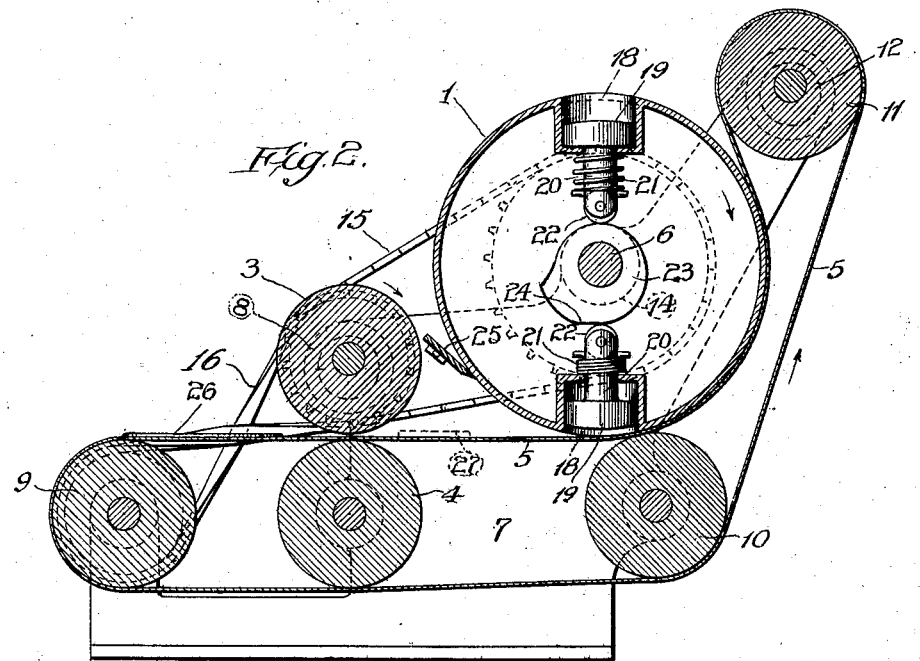

The main objects of this invention are to provide an improved form of pie crust forming machine adapted to shape dough into thin substantially circular sheets suitable for forming crusts of pies with little waste; to provide a device of this class in which the successive operations may be performed rapidly and automatically without necessitating the re-handling of the dough during the process of forming it; and to provide an improved form of pie crust forming machine in which the dough is first molded into an oblong shape and then carried edge-wise between a pair of opposed rollers which elongate the sheets in a direction transverse to the long dimension of the molded sheet, the contour of the mold being such that the opposed rollers will flatten the material into approximately circular shape. These objects are accomplished by the device shown in the accompanying drawings in which:

Figure 1 is a top plan of a pie crust forming machine constructed according to this invention. Fig. 2 is a vertical section of the same on the line 2—2 of Fig. 1.

In the construction shown in the drawings, the device comprises a molding member 1 adapted to compress irregular masses of dough into flat oblong form, a pair of opposed rollers 3 and 4 which are adapted to elongate the dough when passed between them, and an endless belt or apron 5 extending partly around the periphery of the roller 1 and between the rollers 3 and 4, and arranged to be driven at approximately the same peripheral speeds.

The molding roller 1 is loosely journaled on a fixed shaft 6 in the supporting frame 7. The rollers 3 and 4 are journaled on axes which are parallel to the shaft 6, the upper roller 3 having an eccentric bearing 8 adapted to permit of adjusting the roller 3 toward or away from the roller 4 for controlling the thickness of the crusts to be delivered. The apron 5 is preferably in the form of an endless belt passing partly around the periphery of the roller 1 and between the rollers 3 and 4. In addition to its engagement with the rollers 1, 3 and 4 the belt 5 is supported by rollers 9, 10 and 11. The roller 11 is also provided with eccentric bearings 12 which permit of shifting the axis of said roller slightly for tightening the apron.
Power is applied to the machine by a suitable belt extending around the pulley 13. Said pulley is rigidly connected with the roller 1 by means of a hollow sleeve 14 concentric with the shaft 6. A link belt 15 carried by suitable sprocket wheels connects the rollers 1 and
3. The roller 9 is driven by a twist of belt 16 from the shaft of the roller 3.

The roller 1 is provided with pockets 18 in its periphery. These are preferably of elliptical or oblong shape as shown in Fig. 1 and each has a movable bottom in the form of a plunger head 19 which is movable toward and away from the periphery of the roller 1. The outer surfaces of the plunger heads 19 are shaped to conform exactly with the curvature of the periphery of the roller 1. Each plunger is provided with a stem 20 normally urged inward by means of a spring 21 and having a roller 22 at its inner end engaging a cam 23. The cam 23 is so shaped and so disposed upon the fixed shaft 6 that, when one of the pockets 18 is at the top of the roller 1, the bottom 19 will be in its lowest position, leaving the pocket open for receiving a piece of dough. The periphery of the cam is formed to gradually force the bottom 19 outwardly until, when the pocket 18 arrives at its lowest position in the rotation of roller 1, the cake of dough will have been flattened between the apron 5 and the plunger head 19 and will have a contour substantially that of the pocket. The shape of the pocket is such that when passed edgewise between the rollers 3 and 4 the dough will be substantially circular and of suitable thickness for a pie crust.

The apron 5 extends in a substantially horizontal direction after leaving the roller 1 and the parts 24 of the cam surface causes the bottom 19 to rapidly move to a position flush with the periphery of the roller 1 as the pocket 18 moves away from the apron. A scraper 25 is suitably located adjacent to the periphery of the roller 1 for dislodging the cake of dough in case it should adhere to the face of the plunger 19 when said plunger moves away from the apron 5. A finished pie crust is indicated upon the apron 5 at 26 and another is indicated by dotted lines 27 showing its thickness before being passed between the rollers 3 and 4.

The operation of the device is as follows: Assume that the apron and rollers are all being continuously driven at the same peripheral speeds. When one of the pockets 18 arrives in its uppermost position, the operator drops into it a cake of dough of the proper mass for forming pie crust of the desired thickness. The continued rotation of the roller 1 in the direction of the arrow thereon carries the pocket 18 into opposition with the apron 5 which, being taut, bears tightly against the adjacent part of the periphery of the roller 1. The roller 22 riding upon the cam 23 forces the bottom 19 outward and compresses the mass of dough between said bottom and the apron 5 so that when the pocket 18 arrives at its lowest position the mass of dough will have been compressed to a flat cake having a contour approximately the same as that of the pocket 18. The walls of the pocket prevent the dough from spreading in any direction beyond said walls, and thereby insure considerable accuracy in the final shape of the pie crust. As the apron leaves the periphery of the roller 1 in its passage towards the rollers 3 and 4, the bottom 19 is forced outward by the surface 24 of the cam 23 until it is flush with the periphery of the roller 1. This movement frees the cake from the side walls of the pocket and causes it to follow the apron 5. The scraper 25 prevents the possibility of the dough adhering to the bottom 19 and being carried along by the roller 1. By passing between the rollers 3 and 4 the dough is elongated in a direction transverse to the long dimension of its molded form and is carried out upon the apron in a substantially circular form shown at 26.

What I claim as my invention and desire to secure by Letters Patent, is:

1. A pie crust forming machine comprising a rotatable member having therein an oblong pocket, an apron co-acting with the periphery of said member, and movable therewith and a plunger in said pocket movable through the rotation of said member and adapted to compress against said apron a mass of plastic material which is placed in said pocket, and means for discharging said material from said pocket when said pocket has arrived at a certain position in the rotation of said member.

2. A device of the class described comprising a rotatable member having a pocket in its periphery, a plunger in said pocket movable toward and away from the periphery of said member, an apron co-acting with said periphery and movable therewith, and mechanism for moving said plunger toward said apron during the rotation of said member so as to compress within said pocket a mass of plastic material placed therein, said mechanism being adapted to shift said plunger to a position flush with the surface of said member for discharging the contents of said pocket when said pocket arrives at a certain position in the rotation of said member.

3. A device of the class described comprising a rotatable member having a pocket in its periphery, a plunger in said pocket movable toward and away from the periphery of said member, an apron co-acting with said periphery and movable therewith, and mechanism for moving said plunger toward said apron during the rotation of said member so as to compress within said pocket a mass of plastic material placed therein, said mechanism being adapted to shift said plunger to a position flush with the surface of said member for discharging the contents of said pocket when said pocket arrives at a certain position in the rotation of said member, and a scraper adapted to remove the material from the face of said plunger.

4. A device of the class described comprising a rotatable member having a pocket in its periphery, a plunger in said pocket movable toward and away from the periphery of said member, an apron co-acting with said periphery and movable therewith, and mechanism for moving said plunger toward said apron during the rotation of said member so as to compress within said pocket a mass of plastic material placed therein, said mechanism being adapted to shift said plunger to a position flush with the surface of said member for discharging the contents of said pocket when said pocket arrives at a certain position in the rotation of said member, and a stationary scraper adapted to remove the material from the face of said plunger.

5. The combination of a roller having a pocket in its periphery, a bottom in said pocket movable toward and away from the periphery of said roller, an apron extending partly around the periphery of said roller and movable therewith, and mechanism adapted to move said bottom toward said apron for compressing between said bottom and apron a mass of plastic material carried in said pocket, said mechanism being adapted to shift said bottom outward for discharging the contents of said pocket when said pocket arrives at a certain position in the rotation of said roller.

6. A device for forming plastic material into thin substantially circular sheets, comprising a roller having in its periphery an oblong pocket disposed with its long dimension substantially parallel with the axis of said roller, an apron extending around a part of the periphery of said roller, a movable bottom in said pocket, and mechanism for shifting said bottom outwardly while said pocket is in opposition to said apron, said bottom being adapted to compress against said apron a mass of plastic material in said pocket, and a roller journaled near said apron and adapted to co-act therewith for elongating such a mass of material in a direction transverse to the long dimension of said pocket.

7. The combination of a pair of opposed rollers, a movable apron extending through the space between said rollers, a third roller having therein a pocket co-operating with said apron for forming a mass of dough into a flat oblong cake and depositing the same upon said apron with its long dimension disposed transversely to the direction of movement of said apron, said first pair of rollers being adapted to co-act with said apron and elongate such mass of dough in the direction of the movement of said apron.

8. The combination of a roller having a pocket in its periphery, a bottom in said pocket movable toward and away from the periphery, a pair of the opposed rollers journaled at one side of said first roller, a movable apron extending between said opposed rollers and partly around said first roller, mechanism for moving said bottom outwardly for compressing a mass of plastic material in said pocket between said belt and bottom, said belt being adapted to carry said material between said opposed rollers for rolling the same into a thin sheet, substantially as described.

9. The combination of a roller having a pocket in its periphery, a movable bottom in said pocket, a pair of opposed rollers, a movable apron extending partly around the periphery of said first roller and between said opposed rollers, said apron and rollers being driven at substantially the same peripheral speeds, a cam controlling the movement of said bottom and adapted to shift the same outward while said pocket is in opposition to said apron so as to compress a mass of plastic material in said pocket against said apron, said cam being adapted to shift said bottom to a position flush with the periphery of said roller when said pocket passes clear of said apron, and a scraper opposed to the periphery of said roller and adapted to prevent such plastic material from being carried along by said bottom after the same has passed clear of said apron.

10. A pie crust forming machine comprising a movable surface, a mold co-acting with said surface and adapted to form thereon a cake of dough of oblong shape, and a roller co-acting with said surface and adapted to elongate the cake of dough in a direction transverse to its long dimension.

11. A pie crust forming machine comprising a surface, a mold co-acting with said surface for forming thereon an oblong cake of dough, and a roller co-acting with said surface and adapted to elongate said cake of dough in a direction transverse to its long dimension.

12. The combination of a pair of co-acting members, one of said members having therein a pocket provided with a movable bottom and adapted to mold between said members a mass of dough placed in said pocket, and a roller co-acting with one of said members for rolling said mass of dough into a thin sheet after the same has passed out of engagement with other of said members.

13. The combination of a roller having therein a pocket provided with a movable bottom, an apron extending around a part of the periphery of said roller and movable at the same peripheral speed, mechanism for shifting said bottom outwardly while opposed to said apron for molding a mass of dough in said pocket against said apron, and a roller adapted to roll said mass of dough into a thin sheet after the dough passes out from between said apron and first roller.

Signed at Chicago this 7th day of March 1907.

OLIVER COLBORNE.

Witnesses:
K. M. IMBODEN,
E. A. RUMMLER.